US006389132B1

(12) United States Patent
Price

(10) Patent No.: US 6,389,132 B1
(45) Date of Patent: May 14, 2002

(54) MULTI-TASKING, WEB-BASED CALL CENTER

(75) Inventor: Robert Barron Price, Austin, TX (US)

(73) Assignee: AVAYA Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/416,737

(22) Filed: Oct. 13, 1999

(51) Int. Cl.[7] ................................................ H04M 3/00

(52) U.S. Cl. ........................... 379/265.01; 379/215.01; 379/265.02; 379/265.09; 379/266.01; 379/309

(58) Field of Search ............................. 379/93.17, 211, 379/265, 266, 267, 309, 265.09, 215.01; 709/202, 203, 317

(56) References Cited

U.S. PATENT DOCUMENTS 5,335,269 A * 8/1994 Steinlicht .................... 379/266
5,519,767 A * 5/1996 O'Horo et al. .......... 379/67.01
5,557,658 A * 9/1996 Gregorek et al. ........ 379/88.25
5,754,636 A * 5/1998 Bayless et al. ............ 379/142
5,848,142 A * 12/1998 Yaker .................... 379/215.01
5,884,032 A 3/1999 Bateman et al. ....... 395/200.34
5,982,774 A * 11/1999 Foladare et al. ............ 370/401
6,026,156 A * 2/2000 Epler et al. ............ 379/215.01

* cited by examiner

*Primary Examiner*—Ahmad F. Matar
*Assistant Examiner*—Bing Bui
(74) *Attorney, Agent, or Firm*—Blakely, Sokoloff, Taylor & Zafman LLP

(57) ABSTRACT

A system for a web-based call center to provide assistance to multiple simultaneous customers. The system includes at least one external communication pathway through which a customer can submit a request to the enterprise contact center. The enterprise contact center includes a pool of agents that can provide information in response to requests submitted by customers. The system also includes a software engine that routes and schedules customer request to available agents via internal communication pathways. Agents can view customer data on a user interface. The customer data can aid the agents in providing information to the customers. Agents can multi-task by providing assistance to multiple customers at one time. Agents can respond to customer requests using web and telephone communication pathways.

59 Claims, 6 Drawing Sheets

10
MANY CUSTOMERS
12
A
B
C
D
E
14
INTERNET
18
WEB SERVER
20
CONTACT SERVER
22
SWITCH SERVER
16
PSTN
24
INTRANET LAN/WAN
30
POOL OF AGENTS
1
2
3
4
5
28
PBX/ACD
26

12
18
20
30
CUSTOMER
WEB SERVER
CONTACT SERVER
AGENT
1
2
3
4
5
6
7
8
9
10

42
CUSTOMER
48
E-MAIL
John Doe@...com
50
"TO FURTHER ASSIST YOU, PLEASE LOOK AT URL WWW.ANSWER... ...CLICK ON THE LIVE VOICE REQUEST BUTTON IF YOU NEED FUTHER ASSISTANCE"
CUSTOMER
44
AGENT
30
THE ANSWER TO YOUR QUESTION IS...
52
CUSTOMER
46

MULTI-TASKING, WEB-BASED CALL CENTER

TECHNICAL FIELD OF THE INVENTION

This invention relates generally to systems and methods for providing assistance to multiple customers, and more particularly, to a system and method for a multi-tasking telephone and web-based call center.

BACKGROUND OF THE INVENTION

Today's businesses are relying more and more on telecommunications systems to help manage their interaction with others. Customer service often determines how a company is perceived. Businesses want to reduce their customer service costs by enabling their employees to maintain a maximum number of calls and reduce their idle time to a minimum. Conventional or prior art methods typically employ ACD (automatic call distribution) services.

ACD systems route incoming telephone calls to a pool of agents or to a specific agent based on the telephone number dialed by the customer, information entered by the customer, or the customer's phone number. In certain instances when all agents are busy, ACD systems can hold the call in a queue, prompt the caller to leave a voice message for a later call back, or redirect the call to another group of agents with a shorter queue time.

Unfortunately, due to the hold times often encountered with ACD systems, customers may become frustrated and perceive that their time is being wasted. This may deter customers from calling the company on future occasions. As companies rely on agents to handle calls, agent productivity becomes a major cost factor. Therefore, a need exists for a method of providing assistance to a customer that reduces the amount of wasted time perceived by the customer, as well as maintain or increase the productivity of agents at a call center.

SUMMARY OF THE INVENTION

The present invention provides a system and method for a multi-tasking, web-based call center that substantially eliminates or reduces disadvantages and problems associated with previously developed systems and methods used for providing assistance to multiple customers.

More specifically, the present invention provides a system for a telephone and web-based call center that provides assistance to multiple simultaneous customers for a single agent that significantly increases call center productivity. The system includes at least one external communication pathway through which a customer can submit a request to the web-based call center. The web-based call center includes a pool of agents that can provide information in response to requests submitted by customers. The system also includes a software engine that routes and schedules customer request to available agents via internal communication pathways. Agents can view customer data on a user interface. The customer data can aid the agents in providing information to the customs. Agents can multi-task by providing assistance to multiple customer at one time.

The present invention provides an important technical advantage in that customers can browse the web while waiting for a response from an agent. This enables the customer to use their time in a more constructive manner rather than just "sitting" and waiting for a response from an available agent.

The present invention provides another technical advantage in that it allows the agent to multi-task. Thus, the agent can provide information to a first customer and while this customer is becoming familiar with the information, the agent can assist another customer. By multi-tasking, the agent can reduce the overall cost to the call center.

Still yet another technical advantage of the present invention is that customers can interact with more than one agent. For instance a first agent may provide assistance to a customer and then move on to another customer. If the first customer requires further assistance, the customer may be routed to another agent capable of providing follow-up information. This can improve agent productivity since requests do not have to be queued frequently to a single agent.

Another technical advantage of the present invention is that customers can be grouped and their requests can be forwarded to a specialized agent or a live event. In this case, a group of customer requests can be serially addressed, thus saving time and money to the web-based call center.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the FIGS., like numerals being used to refer to like and corresponding parts of various drawings.

The present invention provides a method and system for a web-based call center that efficiently puts customers on hold with information to browse and significantly improves the efficiency of call centers. Methods include scheduling customer interaction, multi-tasking agents, reassigning agents, and grouping customer requests into moderated events.

Figure 1:
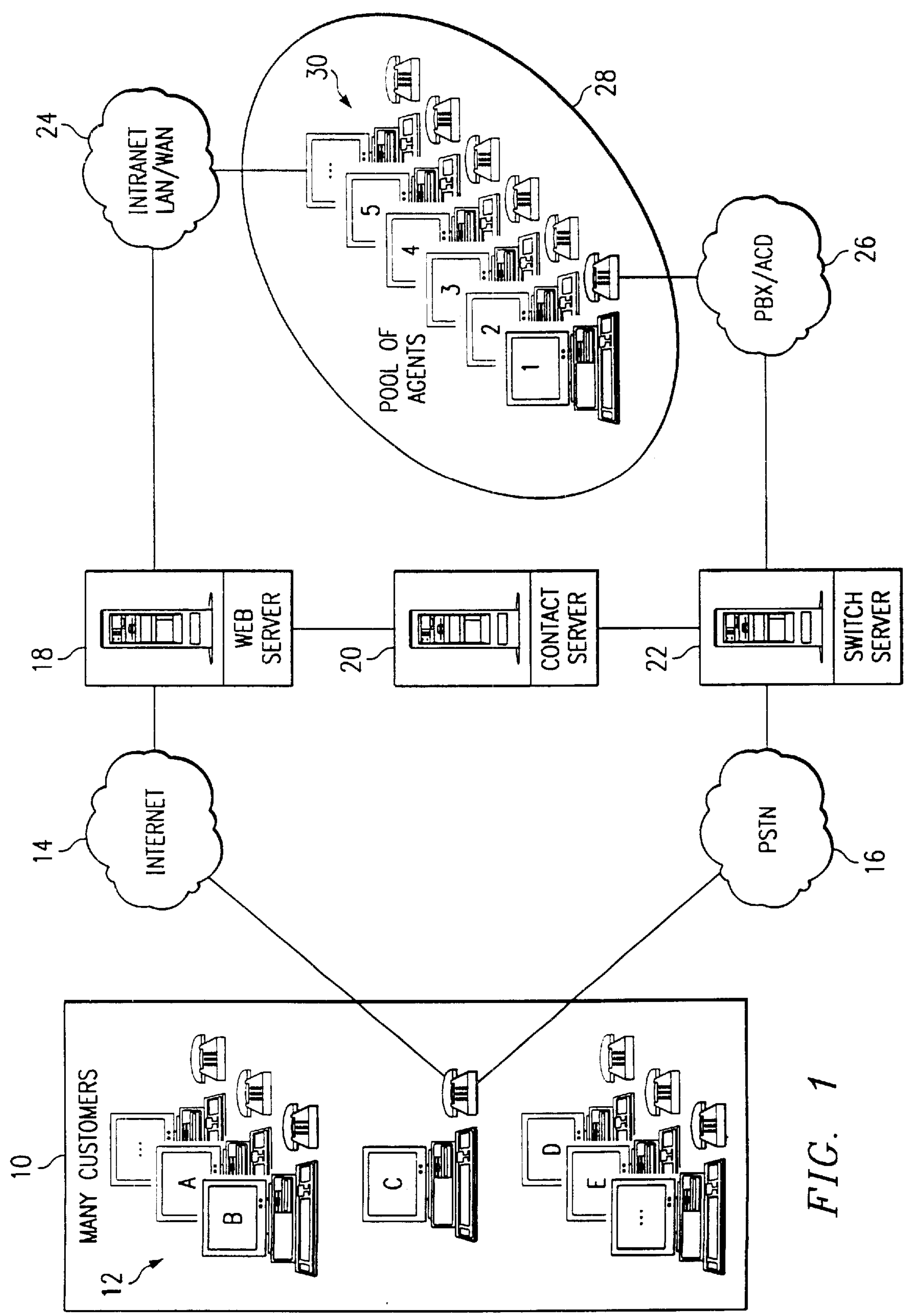
FIG. 1 is a system network diagram of the present invention.

FIG. 1 is a system network diagram including the key components of the present invention. In FIG. 1, multiple customers 10 can view enterprise company's web presentation presented by Web server 18. Multiple customers 10 can contact an enterprise company and submit customer requests through a network, such as internet 14 or Public Switched Telephone Network (PSTN) 16. Contact to an enterprise company can be made using an internet-connected computer with a web browser and/or through a telephone (voice call). Customer requests from multiple customers 10 can be submitted using interactive media formats. Interactive media forms can include telephone calls, sending facsimiles, sending E-mail, looking at web pages, requesting live help from a web page. Live help may include live text, synchronous web pages, voice, video, and/or white boarding.

Pool of agents 28 may be available to aid with contact requests initiated by multiple customers 10. Agents 30 are pooled together in pool of agents 28 so that contact requests can be efficiently routed to the next available agent 30. In certain cases, such as E-mail auto response, agent 30 may be an automated computer program rather than a person. Pool of agents 28 may have internet-connected workstations and telephone connections. Pool of agents 28 may have user interfaces that can present requests from multiple customers 10, present information about the requests, and present information, if available, about multiple customers 10. The user interfaces may also provide capabilities for pool of agents 28 to browse and search for information to be presented to multiple customers 10. Pool of agents 28 can respond to multiple customers 10 using interactive media formats.

Contact Server 20 can manage the sequencing of multiple customers 10 requesting information to pool of agents 28. Contact Server 20 can receive these requests from either Web Server 18 or Switch Server 22. With knowledge of the availability of pool of agents 28, Contact Server 20 can connect a request to an available agent 30 and initiate Web Server 18 and/or Switch Server 22 to establish a live connection with customer 12.

Switch Server 22 can support live voice communication between customer 12 and agent 30. Example Switch Servers include a Private Branch exchange (PBX) and Automatic Call Distribution (ACD) equipment. Switch Server 22 supports telephony functions like placing telephone calls and answering telephone calls, putting calls on hold, transferring calls and providing Interactive Voice Response (IVR) capabilities. Switch Server 22 may have a control link to Contact Server 20 such as CTI, CT Connect or TAPI. Note that it is possible for voice communications, video, and to be entirely over the Internet network (using H.323). In this case Switch Server 22 and associated PSTN 16 and PBX/ACD 26 may not be necessary.

Figure 2:
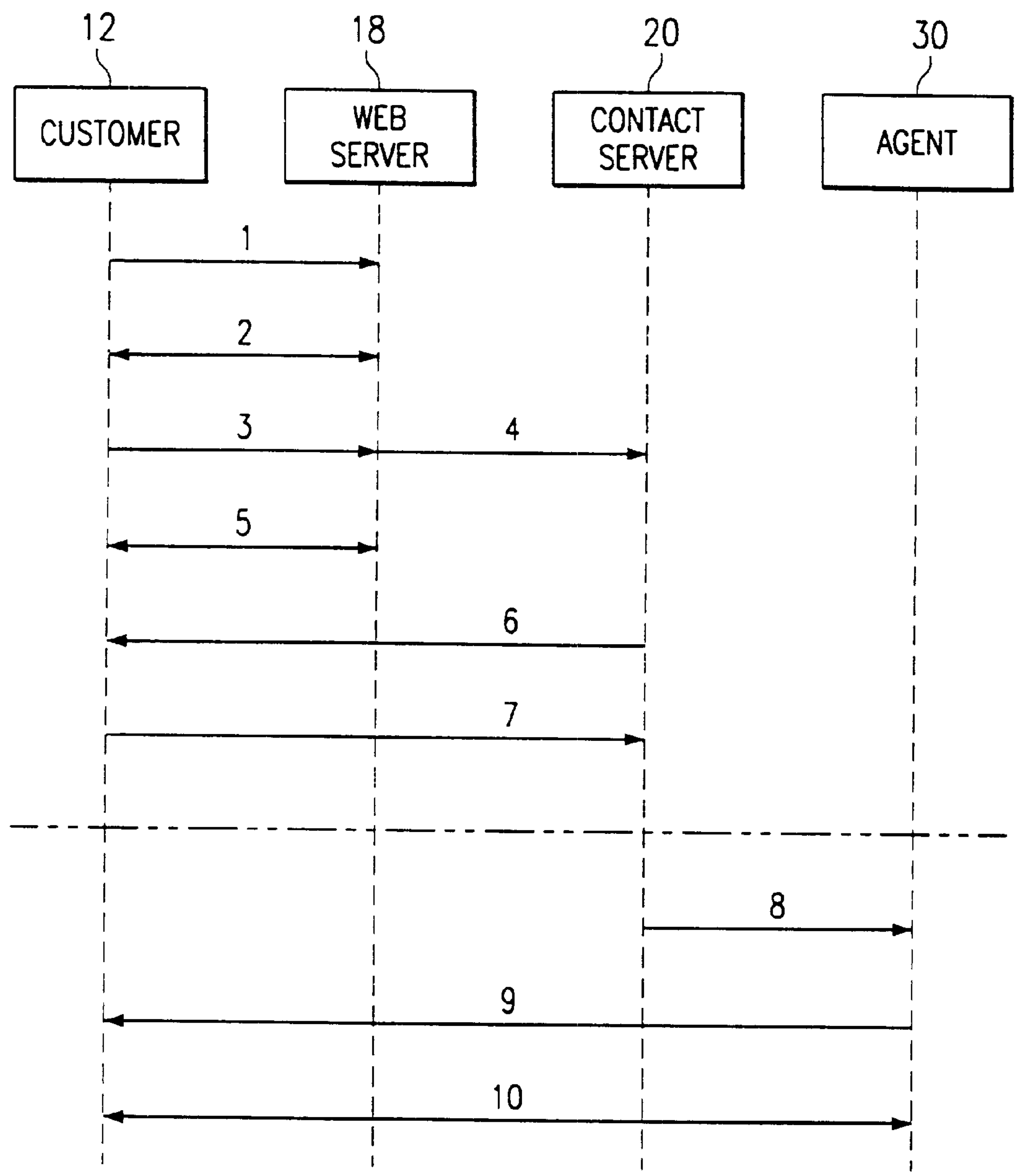
FIG. 2 is a time-line diagram for one embodiment of the present invention using a customer scheduled contact sequence.

FIG. 2 is a time-line diagram for one embodiment of the present invention. The method incorporates a customer-scheduled contact sequence between agent 30 and multiple customers 10. FIG. 2 is an example of the contact sequence. The diagram is for a single customer contacting a single agent, but the concept can be applied to any number of simultaneous customers interacting with multiple agents. The contact sequence is as follows:

(1) Customer 12 can connect to an enterprise web page via web server 18 or customer 12 can connect to a company call center via a phone call, E-mail or facsimile.

(2) Customer 12 can interact with the enterprise web page via web browsing or IVR.

(3) Customer 12 can request to be connected to an agent. This request may be a text request via interactive web browsing, E-mail or facsimile, or a voice request via a phone call or IVR.

(4) The customer request can be queued at the Contact Server 20.

(5) Customer 12 can be placed on hold while waiting for an available agent.

(6) Customer 12 can be provided information about the expected hold time, number in the queue of customer contact requests. Customer 12 can be provided the option to schedule an agent connection at a later time.

(7) Customer 12 chooses to schedule an agent connection at a later time and the contact request is recorded and scheduled at the Contact Server 20 for later connection.

(8) At the scheduled date and time, agent 30 is notified of the scheduled connection. The notification may take the form of a visual or audio notice that is displayed on a work station of agent 30. The request also may be a new item in the work tray of agent 30.

(9) Agent 30 attempts to establish connection with customer 12. This may involve agent 30 telephoning customer 12, sending a facsimile or E-mail to customer 12, informing customer 12 to call or connect to the company website or detecting that customer 12 is connected to the company website and sending an alert message to the web browser of customer 12. Should customer 12 not be available, agent 30 may choose to reschedule the connection or let the system detect the next time customer 12 is available for connection.

(10) With acknowledgement from customer 12, the connection is established between customer 12 and agent 30 to resolve the contact request. The connection may again take numerous forms: talking to customer 12 via telephone, video call, or IP telephony; responding to a facsimile or E-mail; talking to customer 12 via a web-based text chat; sending web pages or other documents to customer 12; sharing a web page that both customer 12 and agent 30 are drawing on, etc. Agent 30 satisfies the request of customer 12 and completes the session by disconnecting from customer 12 and documenting the conversation, or the customer may disconnect from the connection.

(11) With acknowledgement from customer 12, the connection, is established between customer 12 and agent 30 to resolve the contact request. The connection may again take numerous forms: talking to customer 12 via telephone, video call, or IP telephony; responding to a facsimile or E-mail; talking to customer 12 via a web-based text chat; sending web pages or other documents to customer 12; sharing a web page that both customer 12 and agent 30 are drawing on, etc.

(12) Agent 30 satisfies the request of customer 12 and completes the session by disconnecting from customer 12 and documenting the conversation, or the customer may disconnect from the connection.

Figure 3:
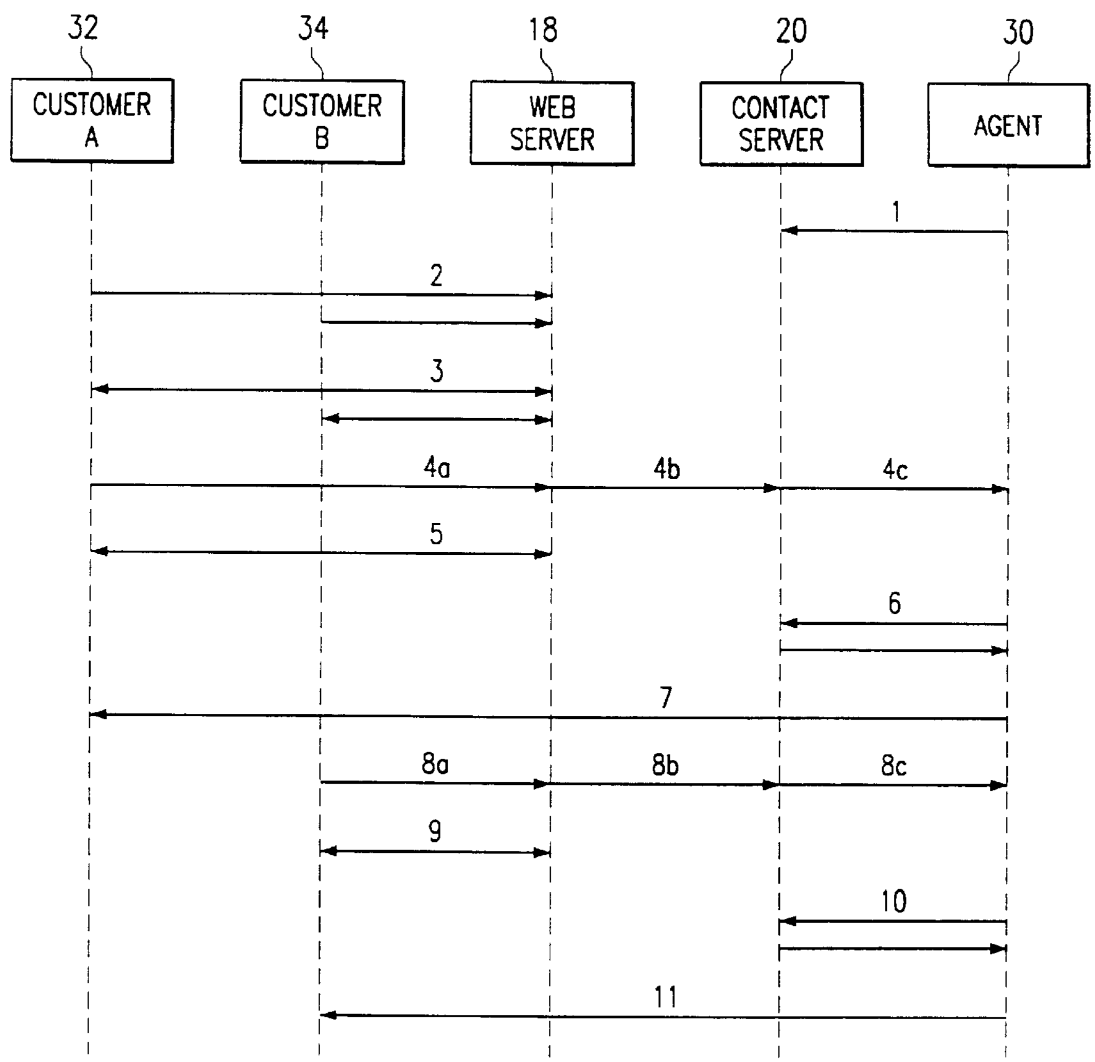
FIG. 3 is a time-line diagram for one embodiment of the present invention using text request-response cycles.

FIG. 3 is a time-line diagram for one embodiment of the present invention. This embodiment incorporates text request-response cycles between agent 30 and multiple customers 10. In FIG. 3, customer A 32 and customer B 34 can simultaneously interact with agent 30 using a text channel for communications. The user interface of agent 30 can display the status of the communication with each customer and can allow agent 30 to see customer text and respond with text. FIG. 3 is an example of the contact sequence. The diagram is for two simultaneous customers. The concept can be applied to any number of simultaneous customers interacting with multiple agents. The contact sequence in FIG. 3 is as follows:

(1) Agent 30 can make himself/herself available to take multiple customer requests.

(2) Customer A 32 and customer B 34 can connect to an enterprise web page via Web Server 18.

(3) Customer A 32 and customer B 34 can interact with the enterprise web presentation.

(4*a*) Customer A 32 can type a text question and request to be connected to an agent. (4*b*) The request can be queued at Contact Server 20 and (4*c*) routed by Contact Server 20 to agent 30. Agent 30 can receive a request notification from Contact Server 20. The request notification may take the form of a visual and audio notice that is displayed on a work station of agent 30. The request may also be a new item in the work tray of agent 30.

(5) Customer A 32 can be placed on hold awaiting availability of agent 30. Customer A 32 can continue browsing and searching the web while waiting on hold.

(6) Agent 30 can select customer A 32 and receive the text question from customer A 32 while waiting for another customer request.

(7) Agent 30 sends a response, such as text, URL, E-mail, to customer A 32 and waits for the next customer request.

(8*a*) Customer B 34 can type a text question and request to be connected to an agent. (8*b*) The request can be queued at Contact Server 20 and (8*c*) routed by Contact Server 20 to agent 30. Agent 30 can receive a request notification.

(9) Customer B 34 is placed on hold awaiting availability of agent 30. Customer B 34 can continue browsing and searching the web while waiting on hold.

(10) While waiting on customer A 32 to respond, agent 30 can select customer B 34 and receive the text question from customer B 34.

(11) Agent 30 can send a response, such as text, URL or E-mail, to customer B 34 while waiting for another customer request.

Steps 4–7 and 8–11 can repeat independently. Thus, agent 30 can handle multiple, simultaneous text conversations. It is important to note that customer 32 or customer 34 can at any time ask to schedule an connection at a specific time or date with agent 30. The scheduling may take the same form as steps (8)–(10) in FIG. 2.

Multi-tasking improves the efficiency of the system by letting agent 30 handle other requests while waiting for customer 12. Because agent 30 can push substantial amounts of information (web pages, URLs, documents, etc.) to customer 12, there is likely to be a period of time while customer 12 reads and understands the information forwarded by agent 30. Where there are overlapping requests, customer 12 may have to wait for agent 30 to get around to answering a request.

Figure 4:
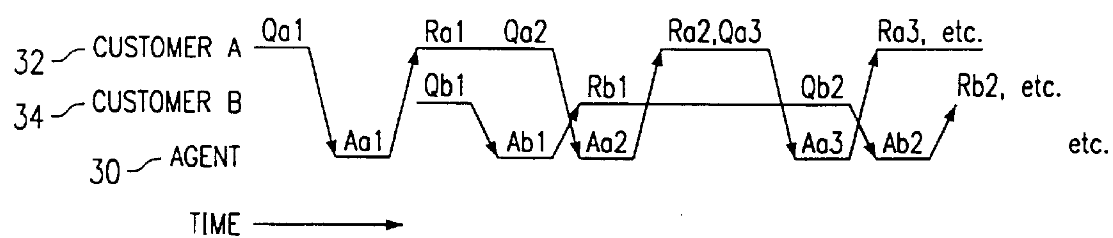
FIG. 4 is a time-line diagram illustrating request-response cycles for the embodiment illustrated in FIG. 3.

FIG. 4 is a time-line that illustrates the style of simultaneous conversations and request-response cycles described in FIG. 3 and illustrates the types of overlaps that can occur. The process can repeat until all customer requests have been satisfied.

Qa1: Customer A 32 sends question 1.

Aa1: Agent 30 answers question 1 from customer A 32.

Ra1: Customer A 32 reads response of agent 30 to question 1.

Qb1: Customer B 34 sends question 1.

Ab1: Agent 30 answers question 1 from customer B 34.

Rb1: Customer B 34 reads response of agent 30 to question 1.

Figure 5:
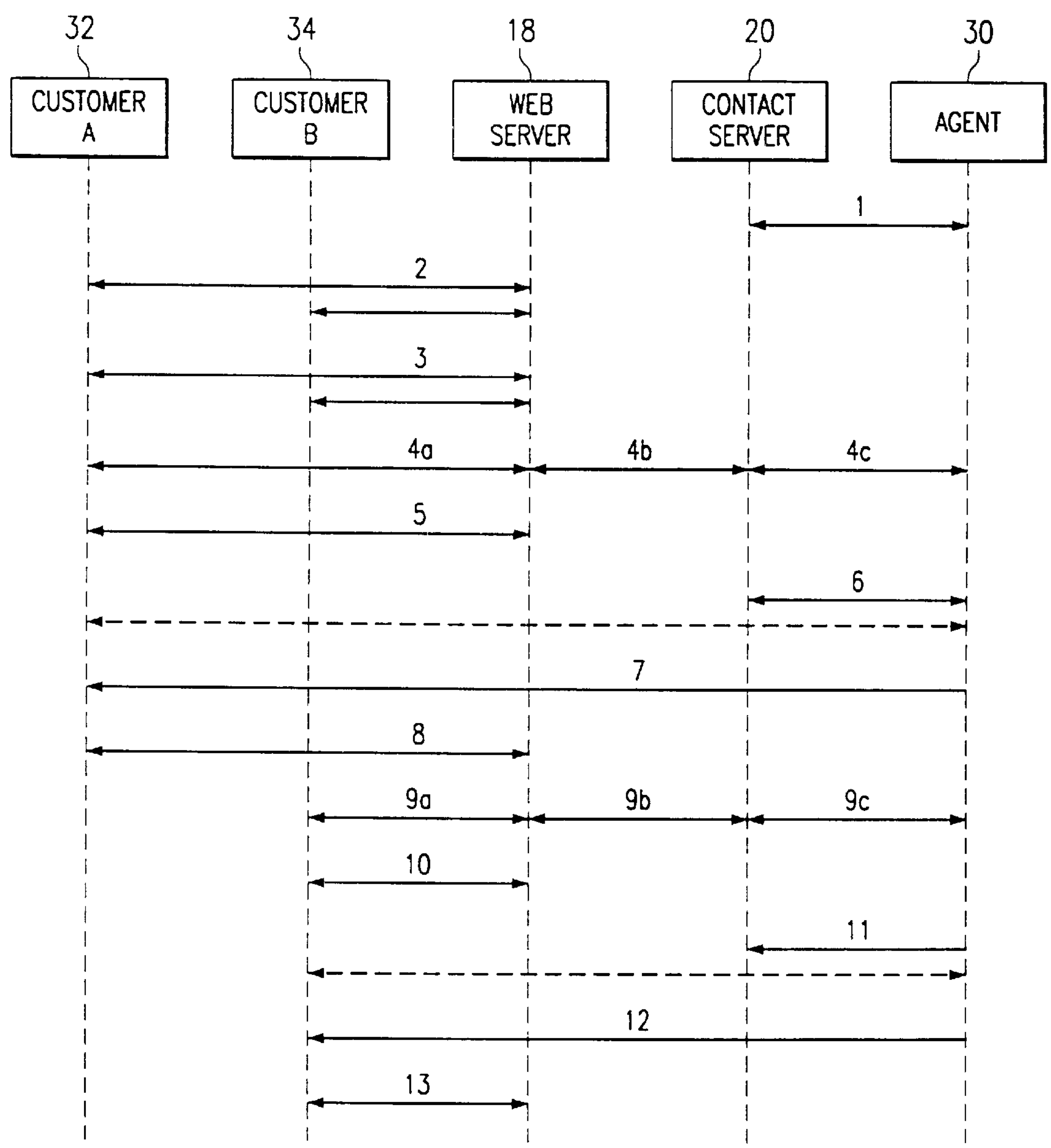
FIG. 5 is a time-line diagram for one embodiment of the present invention using voice request-response cycles.

FIG. 5 is a time-line diagram for another embodiment of the present invention. This embodiment incorporates voice request-response cycles between agent 30 and multiple customers 10. In FIG. 5, customer A 32 and customer B 34 are simultaneously interacting with agent 30, both using a voice channel for communications. FIG. 5 is an example contact sequence. The diagram is for two simultaneous customers, customer A 32 and customer B 34. The concept can be applied to any number of simultaneous customers interacting with multiple agents, using a variety of conversation media types, such as telephone, voiceover IP (IP telephony), video, text chat or E-mail.

The contact sequence in FIG. 5 is as follows:

(1) Agent 30 can make himself/herself available to take multiple customer requests.

(2) Customer A 32 and customer B 34 can connect to an enterprise web page via Web Server 18.

(3) Customer A 32 and customer B 34 can interact with the enterprise web presentation. Both the web pages of customer A 32 and customer B 34 can display a "Live voice request button." Alternatively, customer A 32 or customer B 34 may initiate a phone call to a call center and subsequently a simultaneous web connection with an agent may be established.

(4*a*) Customer A 32 can request a voice connection with an agent. (4*b*) The request is queued at Contact Server 20 and (4*c*) routed by Contact Server 20 to agent 30. Agent 30 can receive a request notification from Contact Server 20.

(5) Customer A 32 can be placed on hold awaiting availability of agent 30. Customer A 32 can continue browsing and searching the web while waiting on hold.

(6) Agent 30 can select customer A 32 and be connected one-to-one with customer A 32 for a voice conversation. This may occur with a web callback (customer A 32 posts the phone number he is at and agent 30 calls customer A 32), Voice over IP, or other forms of voice communication.

(7) Agent 30 can talk to customer A 32 and can send information (such as text or an URL) to the browser of customer A 32. Agent 30 can send customer A 32 enough information to respond to the question of customer A 32.

(8) Agent 30 can politely tell customer A 32 that customer A 32 will be placed on hold while customer A 32 reads the information provided to customer A 32, and that if customer A 32 needs further live assistance, customer A 32 can click on a "live voice request button" displayed on the web page of customer A 32 or some other form of request, such as push to talk to regain contact with agent 30. Agent 30 can place customer A 32 on hold and wait for the next (another) customer request. Customer A 32 can repeat steps 4–8.

(9a) Customer B 34 can request a voice connection with an agent. (9b) The request is queued at Contact Server 20 and (9c) routed by Contact Server 20 to agent 30. Agent 30 can get a request notification from Contact Server 20.

(10) Customer B 34 can be placed on hold awaiting availability of agent 30. Customer B 34 can continue browsing and searching the web while waiting on hold.

(11) Agent 30 can select customer B 34 and can be connected one-to-one with customer B 34 for a voice conversation. This may occur with a web callback (customer B 34 can post the phone number customer B 34 is at and agent 30 can call customer B 34), Voice over IP, or other forms of voice communication.

(12) Agent 30 can talk to customer B 34 and can send information, such as text or an URL, to a browser of customer B 34. Agent 30 can send customer B 34 enough information to respond to questions of customer B 34.

(13) Agent 30 can politely tell customer B 34 that customer B 34 will be placed on hold while customer B 34 reads the information provided to customer B 34 and that if customer B 34 needs further live assistance, customer B 34 can click on a "live voice request button" displayed on the web page of customer B 34 to regain contact with agent 30. Agent 30 can place customer B 34 on hold and wait for the next (another) customer request. Customer B 34 can repeat steps 9–13.

Steps 4–8 and 9–13 repeat independently. Thus, agent 30 can handle multiple, simultaneous voice conversations. It is important to note that customer 32 or customer 34 can at any time ask to schedule an connection at a specific time or date with agent 30. The scheduling may take the same form as steps (8)–(10) in FIG. 2.

Multi-tasking improves the efficiency of the system by letting agent 30 handle other requests while waiting for customer 12. Like the previous multi-tasking text sequence, agent 30 can push substantial amounts of information to customer 12 to read while on hold. When there are overlapping requests, customer 12 may have to wait for agent 30 to reconnect with customer A 32 or customer B 34.

Note this description can use a web-based interface between customer 12 and agent 30 along with a voice channel. The concept applies equally to a voice only connection. In the voice only connection, agent 30 would "push" an IVR (Interactive Voice Response) system to customer 12 and then place customer 12 on hold. Customer 12 would then hear a prerecorded answer and have the option to interact by pressing a button on his phone. One of the button sequences would be to request voice reconnection to agent 30.

Figure 6:
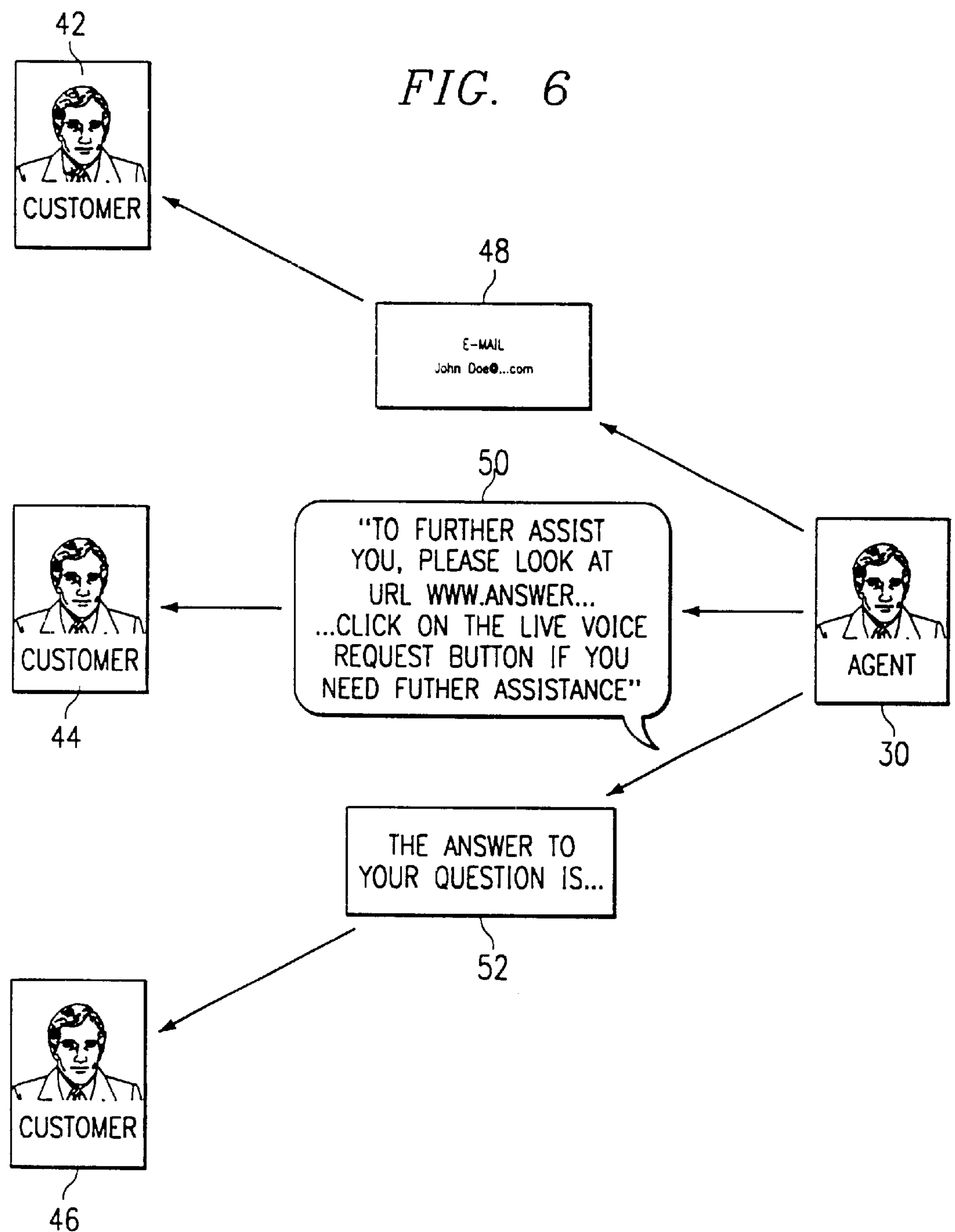
FIG. 6 illustrates one embodiment of the present invention using multiple communication modes between agent and customer.

FIG. 6 represents another embodiment of the present invention in which agent 30 can multi-task across multimedia conversation types. For example, agent 30 can simultaneously handle a live voice conversation, a live text conversation, and an offline E-mail task. Customer 42 may request E-mail response 48, customer 44 may request voice response 50, and customer 46 may request text response 52. Text response 52 and voice response 50 can be made in the manner as described by FIGS. 2 and 4, respectively. E-mail response 48 can be made by customer 42 specifying his E-mail address in a voice connection as described by FIG. 5, or in a text connection as described by FIG. 3. Customer 42 may also access the enterprise company E-mail address from the enterprise company presentation page. By clicking on the E-mail address, customer 42 can E-mail a question which is queued for agent 30. Agent 30 can respond to the question with E-mail response 48.

Figure 7:
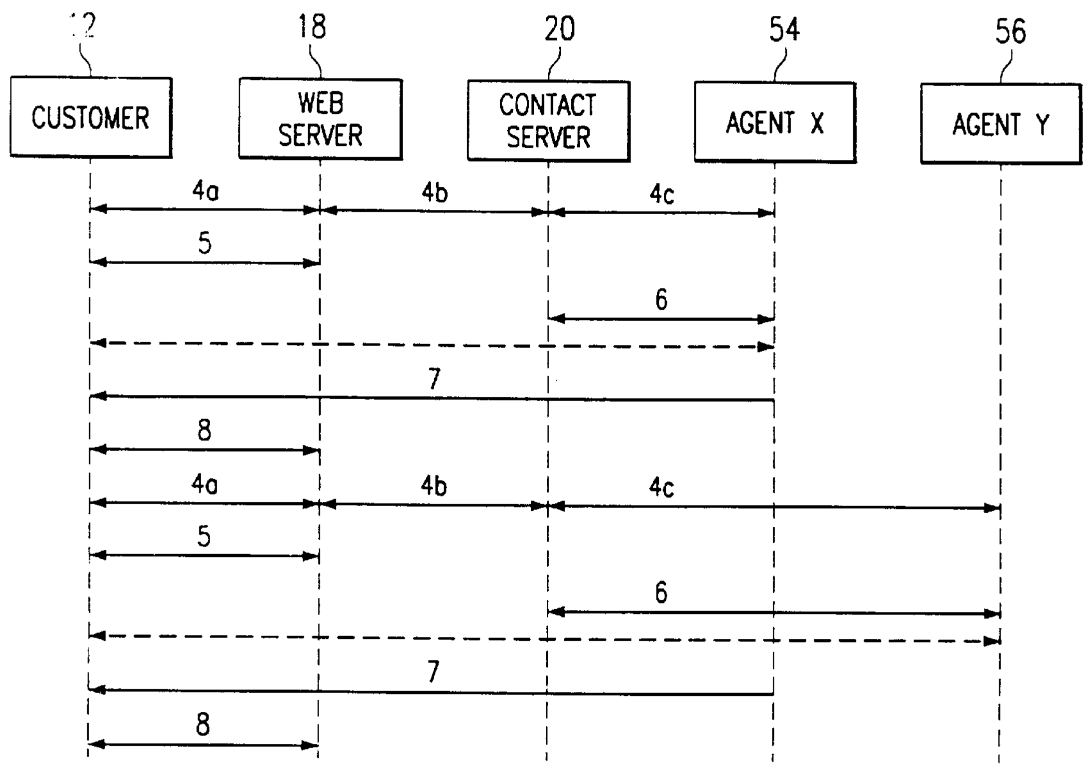
FIG. 7 is a time-line diagram for one embodiment of the present invention in which multiple agents serve one customer.

Another embodiment of the present invention is shown in FIG. 7. FIG. 7 represents a time-line where customer 12 is reconnected to different agents, agent x 54 and agent y 56. Both agent x 54 and agent y 56 are from a pool of qualified agents. This can reduce possible hold times customer 12 may experience.

Customer 12 can request information in a manner as described in FIG. 4, steps 1–3. The steps for the contact sequence are for voice request-response cycles, but the concepts can easily be applied to text request-response cycles. In FIG. 7, steps 4 through 8 from FIG. 5 can repeat twice. The first connection for steps 4 through 8 is with agent x 54, while the second connection for steps 4 through 8 is with agent y 56. This type of switching of agents can continue until the questions of customer 12 have been satisfied. The connections can occur in voice or text format. FIG. 7 illustrates a small representative example of customer 12 with two agents.

The method of reconnecting customer 12 to possible different agents can be accomplished by keeping a complete history of the contact of customer 12. As agent x 54 or agent y 56 selects a request to handle, agent x 54 or agent y 56 can be presented with all of the background information and history relevant to the state of customer 12 at the moment. Agent x 54 or agent y 56 is thus informed of the history of the request of customer 12 and prepared to respond to the request of customer 12.

Figure 8:
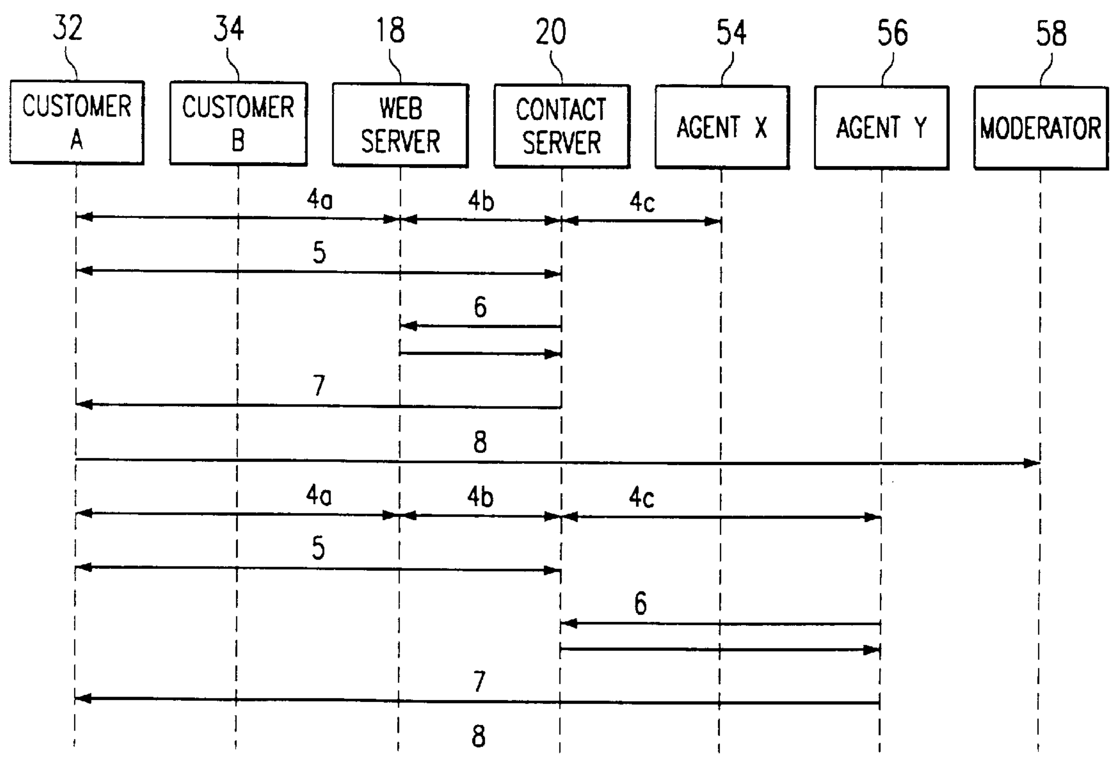
FIG. 8 is a time-line diagram for one embodiment of the present invention in which customer requests may be grouped and routed to a moderated live event.
Figure 5:
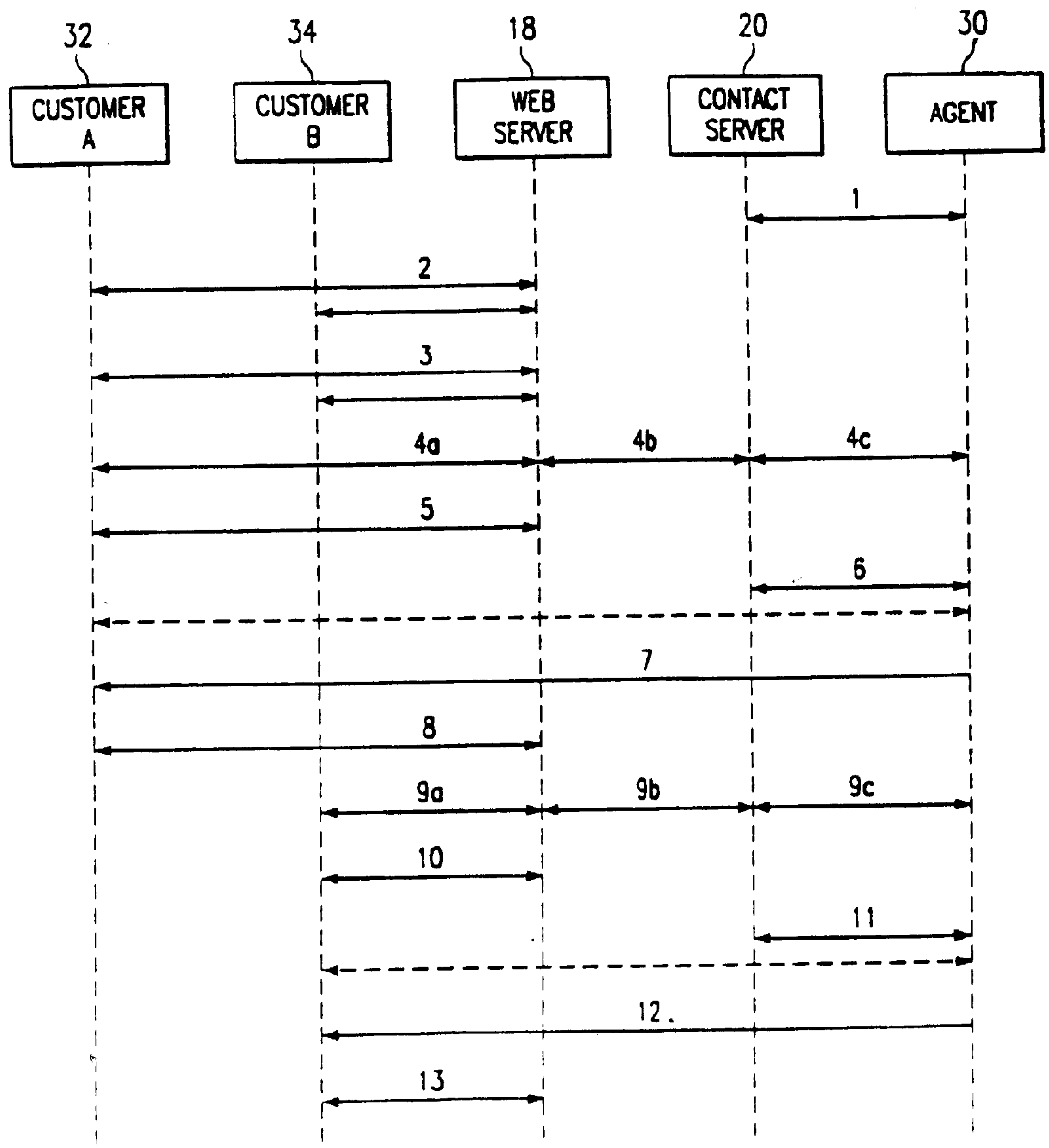

Another embodiment of the present invention is shown in FIG. 8. FIG. 8 illustrates a time-line where moderator 58 is used to interact with multiple customers 10 requesting similar information. The contact sequence is shown for customer A 32 and customer B 34 with agent x 54 and agent y 56. The sequence can be applied, however, to multiple customers and multiple agents. In FIG. 8, the first three steps (not shown) are the same as for FIG. 2. The steps for the contact sequence are for text request-response cycles, but the concept can easily be applied for voice request-response cycles, as well. The contact sequence in FIG. 8 continues as:

(4a) Customer A 32 types a text question and requests to be connected to an agent. (4b) The request is queued at Contact Server 20 and (4c) routed to agent x 54 by Contact Server 20. Agent x 54 can receive a request notification from Contact Server 20.

(5) Customer A 32 is placed on hold awaiting the availability of an agent. Customer A 32 can continue browsing and searching the web using Web Server 18 while waiting on hold.

(6) Agent x 54 can select customer A 32 and receive the request from customer A 32.

(7) Agent x 54 may decide that the question(s) being asked by customer A 32 can be answered in a live event. Agent x 54 can suggest to customer A 32 that customer A 32 connect with the live event moderated by moderator 58.

(8) Customer A 32 connects to the moderated live event moderated by moderator 58.

The same sequence of steps (4)–(8) can be applied to contact between customer B 34 and agent y 56. Therefore, the scenario where customer A 32 and customer B 34 are requesting similar information results in both customer A 32 and customer B 34 being connected with moderator 58.

The concepts presented here improve efficiency of the call center by allowing agent x 54 or agent y 56 to possibly forward multiple requests, thus enabling simultaneous interaction with moderator 58. Therefore, both customer A 32 and customer B 34 can see or hear the interaction of many customers with moderator 58. Examples of moderated interaction include text chat rooms, voice conference calls, a moderated message board (also called live forums), and web based presentations, training and seminars.

The decision to assign customer A 32 or customer B 34 to a live event can be made by 1) agent x 54 or agent y 56 with knowledge of the customer's questions and available events; 2) by an agent supervisor noticing a grouping of question types; or 3) automatically by the system using predefined business rules. The latter two approaches (2, 3) require that requests be categorized. Agent x 54 or agent y 56 could categorize the customer requests or categorization can be done automatically using available knowledge categorization systems that automatically scan text to derive the key topics. Likewise the decision to create and start an event can be made in the same three ways. This method allows a potential huge saving in agent workload, since many requests (a few to 1000s) can be handled by a single agent (moderator 58). It is important to note customers within a live event can have the option to request a "private" agent connection during the event, or have their requests queued for later handling by moderator 58, or a pool of moderators.

The present invention provides an important technical advantage in that it enables multiple customers 10 to browse the web while waiting for responses from pool of agents 28. Multiple customers 10, therefore, can use their time constructively while waiting for a response to their requests.

The present invention provides another technical advantage in that agent 30, can provide information, such as a URL or text document, to a first customer, such as customer A 32. While customer A 32 reads the information, agent 30 can provide information to a second customer, such as customer B 34. Therefore, agent 30 can work in a partial parallel mode and use time in a more efficient manner. Thus, by multitasking, agent 30 can reduce the overall cost to the web call center.

Still yet another technical advantage of the present invention is that multiple customers 10 can interact with more than one agent. For instance, in FIG. 7, customer 12 can be reconnected to agent x 54 or agent y 56. Both agent x 54 and agent y 56 are capable of providing assistance to customer 12. Therefore, rather than having customer 12 wait on hold for agent x 54, customer 12 can be forwarded to agent y 56.

Another technical advantage of the present invention is that customer requests can be grouped and forwarded to a moderator 58 or a live event. This is shown in FIG. 8. In this case, a group of customer requests can be serially addressed, thus saving time and money to the call center.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method comprising:

routing a first communications connection between a first customer and a contact center to a first agent of the contact center;

receiving a service request at the contact center from a second customer;

enqueuing the received service request at the contact center to wait for an agent of the contact center to service the request;

the first agent communicating from the contact center to the first customer via the first connection;

in response to the enqueued request, routing a second communications connection between the contact center and the second customer to the first agent while the first connection remains extant;

servicing the request by communicating between the first agent and the second customer via the second connection while the first connection remains extant; and communicating with the first customer via the first connection subsequently to communicating via the second connection.

2. The method of claim 1, wherein the communication pathways comprise:

an Internet connection utilizing a web browser interface; and a public switched telephone network.

3. The method of claim 1, wherein said communications pathways comprise:

an Internet connection utilizing a web browser interface; and an Internet voice connection.

4. The method of claim 1, wherein said communications pathways comprise:

an Internet connection utilizing a web browser interface; and a video connection.

5. The method of claim 1, wherein said service request is in an interactive media format.

6. The method of claim 1, wherein said agents comprises human agents.

7. The method of claim 6, wherein said agents further comprises automated computer program agents.

8. The method of claim 1, wherein said response is in an interactive media format.

9. The method of claim 1, wherein servicing said customer service request further comprises placing said at least one customer on hold while searching for a response to said customer service request or while communicating with another customer in said plurality of customers.

10. The method of claim 1, further comprising allowing said at least one customer to browse the Internet while waiting on hold.

11. The method of claim 1, wherein said servicing said service request further comprising forwarding said service request to an alternate agent.

12. The method of claim 11, wherein said alternate agent is a specialized agent with a specialized knowledge to answer said service request.

13. The method of claim 11, wherein said alternate agent is a specialized agent with a specialized knowledge to answer or monitor said service request.

14. The method of claim 11, wherein said alternate agent is a specialized agent moderating a live event.

15. The method of claim 1, further comprises scheduling a scheduled contact between said second customer and said first agent.

16. The method of claim 15, wherein said first connection is in an interactive media format.

17. The method of claim 1 further comprising:

enabling the second customer to receive data from a source other than the contact center while the request is enqueued.

18. The method of claim 1 further comprising:

enabling the second customer to browse the World Wide Web while the request is enqueued.

19. The method of claim 1 further comprising:

enabling the first customer to browse the World Wide Web while servicing the request by communicating between the first agent and the second customer via the second connection.

20. The method of claim 1 wherein:

the first agent communicating via the first connection comprises sending data to the first customer.

21. The method of claim 1, wherein:

communicating with the second connection is preceded by placing the first connection on hold; and communicating via the first connection subsequently to communicating via the second connection is preceded by taking the first connection off hold.

22. The method of claim 1 wherein:

communicating via the first connection subsequently to communicating via the second connection comprises the first agent again communicating with the first customer via the first connection.

23. The method of claim 1 wherein:

communicating via the first connection subsequently to communicating via the second connection comprises rerouting the first communications connection from the first agent to another agent of the call center; and the other agent communicating with the first customer via the rerouted first connection.

24. The method of claim 1 wherein:

the first agent communicating via the first connection comprises in response to a first request from the first customer, the first agent sending data to the first customer via the first connection; and communicating with the first customer via the first connection subsequently to communicating via the second connection comprises in response to a second request received from the first customer via the first connection, the first agent or another agent of the contact center communicating with the first customer via the first connection.

25. The method of claim 1 wherein:

communicating with the first customer via the first connection subsequently to communicating via the second connection comprises rerouting both the first and the second connection to a common endpoint of the contact center such that both the first and the second connection are connected to the common endpoint at a same time and both the first and the second customer are communicating with the common endpoint at the same time.

26. The method of claim 25 wherein:

the common endpoint is an agent of the contact center having a live multi-party interaction with the first and the second customer.

27. A machine-readable medium that provides instructions, which when executed by a set of one or more processors, cause said set of processors to perform operations comprising:

routing a first communications connection between a first customer and a contact center to a first agent of the contact center;

receiving a service request at the contact center from a second customer;

enqueuing the received service request at the contact center to wait for an agent of the contact center to service the request;

the first agent communicating from the contact center to the first customer via the first connection;

in response to the enqueued request, routing a second communications connection between the contact center and the second customer to the first agent while the first connection remains extant;

servicing the request by communicating between the first agent and the second customer via the second connection while the first connection remains extant; and communicating with the first customer via the first connection subsequently to communicating via the second connection.

28. The machine-readable medium of claim 22 further comprising:

enabling the second customer to receive data from a source other than the contact center while the request is enqueued.

29. The machine-readable medium of claim 27 further comprising:

enabling the first customer to browse the World Wide Web while servicing the request by communicating between the first agent and the second customer via the second connection.

30. The machine-readable medium of claim 27 further comprising:

enabling the second customer to browse the World Wide Web while the request is enqueued.

31. The machine-readable medium of claim 27 wherein:

the first agent communicating via the first connection comprises sending data to the first customer.

32. The machine-readable medium of claim 27 wherein:

routing the second connection is preceded by placing the first connection on hold; and communicating via the first connection subsequently to communicating via the second connection is preceded by taking the first connection off hold.

33. The machine-readable medium of claim 27 wherein:

communicating via the first connection subsequently to communicating via the second connection comprises the first agent again communicating with the first customer via the first connection.

34. The machine-readable medium of claim 27 wherein:

communicating via the first connection subsequently to communicating via the second connection comprises rerouting the first communications connection from the first agent to another agent of the call center; and the other agent communicating with the first customer via the rerouted first connection.

35. The machine-readable medium of claim 27 wherein:

the first agent communicating via the first connection comprises in response to a first request from the first customer, the first agent sending data to the first customer via the first connection; and communicating with the first customer via the first connection subsequently to communicating via the second connection comprises in response to a second request received from the first customer via the first connection, the first agent or another agent of the contact center communicating with the first customer via the first connection.

36. The machine-readable medium of claim 27 wherein:

communicating with the first customer via the first connection subsequently to communicating via the second connection comprises rerouting both the first and the second connection to a common endpoint of the contact center such that both the first and the second connection are connected to the common endpoint at a same time and both the first and the second customer are communicating with the common endpoint at the same time.

37. The machine-readable medium of claim 36 wherein:

the common endpoint is an agent of the contact center having a live multi-party interaction with the first and the second customer.

38. A web-based call center for providing assistance to at least one customer node comprising:

at least one external communication pathway with which to receive at least one customer request at the web-based call center;

a plurality of agent nodes operable to provide information responding to said at least one customer request to said at least one customer node;

a software engine operable to route and schedule said at least one customer request to an available agent node selected from said plurality of agent nodes via at least one internal communication pathway, said software engine further operable to service a first communication between a first customer node and a first agent node subsequent to having the first communication remain extant while servicing a second communication between the first agent node and a second customer node; in response to an enqueued request corresponding to the second customer node and a user interface operable to display customer data to said available agent node wherein said data aids said available agent in assisting said at least one customer node.

39. The web-based call center of claim 38 wherein said at least one external communication pathway comprises:

an Internet connection utilizing a web browser interface; and a public switched telephone network.

40. The web-based call center of claim 38, wherein said at least one internal communication pathway are selected from the group consisting of:

a local area network;

an intranet;

a private branch exchange telephone system; and an automatic call distribution system which supports telephony functions.

41. The web-based call center of claim 38, wherein said at least one internal communication pathway and said at least one external communication pathway support live communications between said at least one customer node and said available agent node.

42. The web-based call center of claim 38, further comprising at least one server operable to switch communications between said at least one internal communication pathway and said at least one external communication pathway.

43. The web-based call center of claim 38, wherein said at least one customer request is in an interactive media format.

44. The web-based call center of claim 38, wherein said information responding to said at least one customer request is provided to said at least one customer node in an interactive media format.

45. The web-based call center of claim 38, wherein said software engine is further operable to group a set of similar customer requests and forward said similar customer requests to a specialized agent node capable of answering said similar customer requests or to a specialized live event.

46. The web-based call center of claim 38, wherein said software engine is operable to forward said at least one customer request from said available agent node to at least one second agent node in said plurality of agent nodes.

47. The web-based call center of claim 38, wherein said pool of agent nodes comprises human agents.

48. The web-based call center of claim 47, wherein said pool of agent nodes further comprises automated computer program agent nodes.

49. An apparatus to route communications comprising:

means for routing a first communications connection between a first customer node and first agent node, the first agent node communicating to the first customer node via the first connection;

means for receiving a service request from a second customer node;

means for enqueuing the received service request to wait for an agent node to service the request;

means for routing a second communications connection from the second customer node to the first agent node, in response to the enqueued request, while the first connection remains extant;

means for servicing the service request by communicating between the first agent node and the second customer node via the second connection while the first connection remains extant; and means for communicating with the first customer node via the first connection subsequently to communicating via the second connection.

50. The apparatus of claim 49 wherein said communicating comprises sending data to the first customer.

51. The apparatus of claim 49 wherein the means for communicating with the second connection is preceded by placing the first connection on hold; and communicating via the first connection subsequently to communicating via the second connection is preceded by taking the first connection off hold.

52. The apparatus of claim 49 wherein, the means for communicating via the first connection subsequently to communicating via the second connection comprises the first agent node again communicating with the first customer node via the first connection.

53. The apparatus of claim 49 wherein the means for communicating via the first connection subsequently to communicating via the second connection comprises:

a means for rerouting the first communications connection from the first agent node to another agent node; and the other agent node communicating with the first customer node via the rerouted first connection.

54. The apparatus of claim 49 wherein the first agent node communicating via the first connection comprises:

the first agent node sending data to the first customer node via the first connection, in response to a first request from the first customer node; and communicating with the first customer node via the first connection subsequently to communicating via the second connection comprises in response to a second request received from the first customer node via the first connection, the first agent node or another agent node communicating with the first customer node via the first connection.

55. The apparatus of claim 49 wherein:

communicating with the first customer node via the first connection subsequently to communicating via the second connection comprises a means for rerouting both the first and the second connection to a common endpoint such that both the first and the second connection are connected to the common endpoint at a same time and both the first and the second customer nodes are communicating with the common endpoint at the same time.

56. A contact distributor system comprising:

a plurality of customer nodes, a first of the plurality of customer nodes to transmit a first service request via a first communications connection; and a contact center, the contact center to receive the first service request via the first communications connection; and the contact center to route the first communications connection between the contact center and the first of the plurality of customer nodes to a first of a plurality of agent nodes; and the contact center to receive a second service request via a second communications connection; and a queue for enqueuing the second service request at the contact center to wait for an agent of the contact center to service the request; and the first of the plurality of agent nodes in communication with the first of the plurality of customer nodes via the first communications connection; and the contact center to route the second communications connection between the first of the plurality of agent nodes and a second of the plurality of customer nodes via the second communications connection in response to an enqueued request, while the first communications connection remains extant; and the contact center to communicate with the first of the plurality of customer nodes via the first communications connection subsequently to communicating via the second communications connection.

57. The system of claim 56 where said second of the plurality of customer nodes to receive data from a source other than the contact center while the first service request remains extant.

58. The system of claim 56 where said second of the plurality of customer nodes is in communication via the World Wide Web.

59. The system of claim 56 where said first of the plurality of agent nodes sends data to said first of the plurality of customer nodes.

* * * * *

UNITED STATES PATENT AND TRADEMARK OFFICE

CERTIFICATE OF CORRECTION

PATENT NO. : 6,389,132 B1
DATED : May 14, 2002
INVENTOR(S) : Robert Barron Price It is certified that error appears in the above-identified patent and that said Letters Patent is hereby corrected as shown below:

Drawings,
Figure 5, the arrow associated with reference number 11 should also point to the right as shown on attached drawing sheet.

Column 4,
Delete lines 37-49.

Signed and Sealed this

Twenty-third Day of May, 2006

JON W. DUDAS
*Director of the United States Patent and Trademark Office*